United States Patent

Papaioannou

[15] 3,694,452
[45] Sept. 26, 1972

[54] PROCESS FOR PREPARING A 1-(LOWER ALKYL)-5-NITRO-2-IMIDAZOLECARBOXIMIDATE ESTER

[72] Inventor: Christos George Papaioannou, Somerset, N.J.

[73] Assignee: American Cyanamid Company, Stamford, Conn.

[22] Filed: April 17, 1970

[21] Appl. No.: 29,686

[52] U.S. Cl. ............ 260/309, 260/240 R, 260/306.8
[51] Int. Cl. .................................................. C07d 49/30
[58] Field of Search .............. 260/306.8 D, 309, 453

[56] References Cited

FOREIGN PATENTS OR APPLICATIONS 6,815,992     1968     Japan .................. 260/306.8 D

OTHER PUBLICATIONS

Elderfield; Heterocyclic Compounds, Vol. 7, Wiley, New York, pp. 587– 595 (1961).
Djerassi et al.; J. Am. Chem Soc., 69, 1688–1692 (1947).
Wagner, et al.; Synthetic Organic Chemistry, Wiley, New York, p. 635 (1953).

*Primary Examiner*—Alex Mazel
*Assistant Examiner*—R. J. Gallagher
*Attorney*—Edward A. Conroy, Jr.

[57]          ABSTRACT

This disclosure describes a multistep process for the preparation of certain 2-amino-5-[1-(lower alkyl)-5-nitro-2-imidazoyl]-1,3,4-thiadiazoles; the products of the process being useful as antibacterial and antiprotozoal agents.

2 Claims, No Drawings

PROCESS FOR PREPARING A 1-(LOWER ALKYL)-5-NITRO-2-IMIDAZOLECARBOXIMIDATE ESTER

BRIEF SUMMARY OF THE INVENTION

This invention relates to a novel preparative method involving the reaction of a mixed anhydride of an N-aroyl-1-(lower alkyl)-5-nitro-2-imidazolecarboximidic acid and a benzoic acid (I) with a lower alkanol in the presence of a strong base to afford the corresponding lower alkanol ester of 1-(lower alkyl)-5-nitro-2-imidazolecarboximidic acid (II); condensing the 1-(lower alkyl)-5-nitro-2-imidazolecarboximidate ester (II) with a thiosemicarbazide to afford the corresponding 1-[1-(lower alkyl)-5-nitro-2-imidazolecarboximidoyl]-3-thiosemicarbazide (III); and cyclizing the substituted thiosemicarbazide (III) to form the desired 2-amino-5-[1-(lower alkyl)-5-nitro-2-imidazolyl]-1,3,4-thiadiazole (IV). The products (IV) of the novel process are useful antibacterial and antiprotozoal agents as is more fully set forth in U.S. Pat. No. 3,452,035 to Berkelhammer et al.

DETAILED DESCRIPTION OF THE INVENTION

The novel process of the present invention proceeds as set forth in the following reaction scheme:

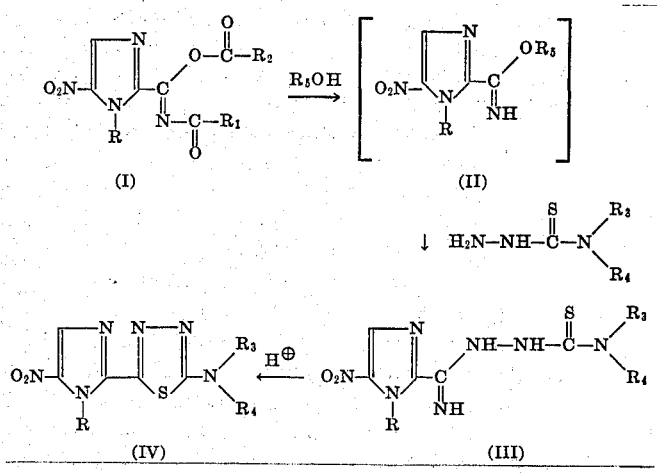

wherein R and $R_5$ are the same or different and are each lower alkyl, $R_1$ and $R_2$ are the same or different and are each phenyl or para-substituted phenyl, and $R_3$ and $R_4$ are the same or different and are each hydrogen or lower alkyl. Suitable lower alkyl groups contemplated by the present invention are those having up to four carbon atoms such as, for example, methyl, ethyl, n-propyl, iso-butyl, sec-butyl, etc. Suitable para-substituted phenyl groups contemplated by the present invention are, for example, p-tolyl, p-chlorophenyl, p-bromophenyl, p-nitrophenyl, p-methoxyphenyl, p-acetoxyphenyl, p-acetylphenyl, p-acetamidophenyl, and the like. In accordance with the above reaction scheme, the conversion of the mixed anhydrides (I) to the corresponding 1-(lower alkyl)-5-nitro-2-imidazolecarboximidate esters (II) is accomplished with a strong base in a lower alkanol solvent ($R_5OH$; e.g., methanol, ethanol, isopropanol, n-butanol, etc.) at a temperature of from about 0°C. to about 100°C., preferably 20°–30°C., for a period of time of a few hours or more. The esters (II) are not isolated but are converted in situ to the 1-substituted-3-thiosemicarbazides (III). Suitable strong bases are, preferably, alkali metal hydroxides, cyanides, or alkoxides such as sodium hydroxide, potassium hydroxide, sodium cyanide, potassium cyanide, potassium tert-butoxide, sodium methoxide, sodium ethoxide, and the like. While only a catalytic amount of base in excess of and in addition to a stoichiometric equivalent is required for the reaction, two or even 3 mole equivalents of base may be employed. However, larger excesses of strong base do not appear to have any advantage.

The conversion of the esters (II) to the corresponding 1-substituted-3-thiosemicarbazides (III) is accomplished in situ by treatment of the esters (II) with an equimolar amount of a thiosemicarbazide of the formula:

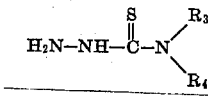

wherein $R_3$ and $R_4$ are as hereinabove defined. An amount of an organic carboxylic acid such as acetic, benzoic, propionic, butyric, etc. is added sufficient to first neutralize the reaction mixture and then provide a catalytic or greater amount of the acid. This condensation is then carried out at a temperature of from about 0°C. to about 100°C., preferably 20°–30°C., for a period of time of a few hours or more in the lower alkanol solvent. Alternatively, a catalytic amount of a strong mineral acid or a strong organic acid, such as benzenesulfonic acid or trifluoroacetic acid, may be used provided the temperature is held between about 0°C. and about 30°C. The product (III) is removed by filtration, treated with sodium bicarbonate solution, washed and dried.

The cyclization of the 1-substituted-3-thiosemicarbazides (III) to the corresponding 2-amino-5-[1-(lower alkyl)-5-nitro-2-imidazolyl]-1,3,4-thiadiazoles (IV) is accomplished by means of a strong mineral acid or a strong organic acid in a lower alkanol (e.g., methanol, ethanol, isopropanol, etc.) as solvent. Suitable mineral acids which may be employed are, for example, hydrogen fluoride, conc. hydrochloric, conc. hydrobromic, conc. sulfuric, and the like. Among the strong organic acids that can be used are p-toluenesulfonic acid, trifluoroacetic acid, and the like. The reaction is best carried out at a temperature of from about 0°C. to about 150°C., conveniently at the reflux temperature, for a period of about an hour, more or less.

The product (IV), which separates from the reaction mixture, is removed by filtration, washed and dried.

By referring to the reaction scheme it can be seen that the mixed anhydride (I) can be converted to the thiadiazole (IV) in a "telescoped" process. This involves the steps of (1) treating the mixed anhydride (I) with at least 1 mole equivalent plus a catalytic amount, preferably 2 mole equivalents, of a strong base, as defined hereinabove, in the presence of a lower alkanol solvent, also as described hereinabove; (2) treating the thus formed mixture with a thiosemicarbazide with a catalytic amount of an organic or mineral acid present, and (3) heating the thus formed reaction mixture with a mineral or strong organic acid, preferably selected from the group consisting of hydrohalic acids, sulfur containing mineral acids, p-toluenesulfonic acid, or trifluoroacetic acid.

The starting materials (I) for the novel process of the present invention may be readily prepared from a 1-(lower alkyl)-2-methyl-5-nitroimidazole (VII) in accordance with the following reaction scheme:

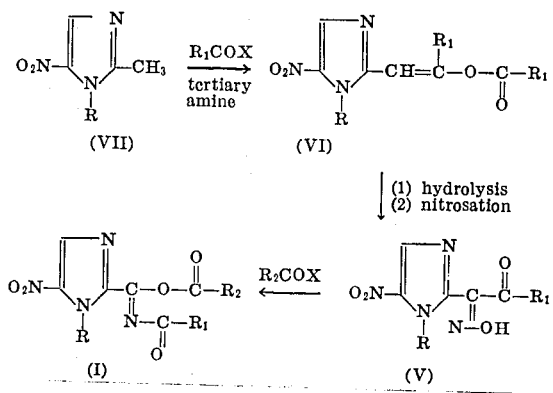

wherein R, $R_1$ and $R_2$ are as hereinabove defined and X is chloro or bromo. As set forth above, condensation of a 1-(lower alkyl)-2-methyl-5-nitroimidazole (VII) with an aroyl halide ($R_1COX$) affords the corresponding benzoate or para-substituted benzoate ester of 1-(lower alkyl)-5-nitro-α-aryl-2-imidazoleethenol (VI). This condensation is best carried out in an inert solvent such as tetrahydrofuran, diglyme, toluene, and the like in the presence of a tertiary amine such as trimethylamine, triethylamine, or diisopropylethylamine at a temperature of about 25°C. to 125°C. for a period of time of 16–24 hours. From about 2 to about 2.5 mole equivalents of the aroyl halide ($R_1COX$) are preferably employed and a sufficient amount of tertiary amine is used to both catalyze the reaction and to react with the hydrogen halide produced.

The 1-(lower alkyl)-5-nitro-α-aryl-2-imidazoleethenol arylcarboxylate (VI) is converted to the corresponding 1-oximino-1-[1-(lower alkyl)-5-nitro-2-imidazolyl]-2-arylglyoxal (V) by hydrolysis to the intermediate 1-(lower alkyl)-5-nitro-α-aryl-2-imidazoleethenol (not isolated) followed by nitrosation in situ. The hydrolysis step is best carried out in aqueous ethanol as solvent with a strong mineral acid (e.g., conc. hydrochloric, conc. sulfuric, etc.) at the reflux temperature for a period of time of 4–8 hours. The resulting solution is cooled to 10–20°C. and nitrosation is accomplished by adding an aqueous solution of sodium nitrite or potassium nitrite and stirring the reaction mixture at about room temperature for a period of time of 3–6 hours.

The so obtained 1-oximino-1-[1-(lower alkyl)-5-nitro-2imidazolyl]-2-arylglyoxal (V) is converted to the corresponding mixed anhydride of N-aroyl-1-(lower alkyl)-5-nitro-2-imidazolecarboximidic acid and a benzoic acid (I) by treatment with an aroyl halide ($R_2COX$). The conversion of (V) to (I) is best carried out in an inert solvent such as acetonitrile, nitromethane, dimethylformamide, ethyl acetate, benzene, toluene, o-dichlorobenzene, etc. (although excess of the aroyl halide can also be used as the solvent) at a temperature of about 25°C. to 150°C., preferably at a temperature of from about 60°C. to about 100°C. The reaction generally requires from about 30 minutes to 2 hours for completion but this time may be extended if desired. It is usually found to be practical to conduct the reaction employing a stoichiometric excess of the aroyl halide ($R_2COX$) reactant. A slight excess is generally sufficient to give optimum product yields but on occasion it may be desirable to employ a large excess, for example, 2 or 3 mole equivalents of aroyl halide ($R_2COX$) per mole of (V). Larger excesses of aroyl halide may be used but there is generally no advantage to be gained in product yield.

The invention will be described in greater detail in conjunction with the following specific examples.

EXAMPLE 1

Preparation of 1-methyl-5-nitro-α-phenyl-2-imidazoleethenol benzoate

Trimethylamine, 33.8 grams, 0.573 mole, is dissolved in 120 ml. of toluene. The solution is mixed with 20 grams, 0.141 mole, of 1,2-dimethyl-5-nitroimidazole and 41 ml., 0.354 mole, of benzoyl chloride. The reaction mixture is stirred at about 25°C. for about 15 hours. The resulting bright yellow precipitate is filtered, mixed with 100 ml. of water, refiltered, washed with water, and dried. There is obtained 47.7 grams, 97 percent, of 1-methyl-5-nitro-α-phenyl-2-imidazoleethenol benzoate, m.p. 205°–207°C.

EXAMPLE 2

Preparation of 1-ethyl-5-nitro-α-phenyl-2-imidazoleethenol benzoate

The procedure of Example 1 is repeated, substituting an equimolar amount of 1-ethyl-2-methyl-5-nitroimidazole for the 1,2-dimethyl-5-nitroimidazole employed in that example. There is thus obtained the 1-ethyl-5-nitro-α-phenyl-2-imidazoleethenol benzoate.

EXAMPLE 3

Preparation of 1-ethyl-5-nitro-α-(p-tolyl)-2-imidazoleethenol p-toluate

By replacing the benzoyl chloride employed in Example 2 with an equimolar quantity of p-toluyl chloride and following substantially the same procedure of Example 2, there is obtained the 1-ethyl-5-nitro-α-(p-tolyl)-2-imidazoleethenol p-toluate.

EXAMPLE 4

Preparation of 1-isopropyl-5-nitro-α-(p-chlorophenyl)-

2-imidazoleethenol p-chlorobenzoate

Following the general procedure of Example 1, 1-isopropyl-2-methyl-5-nitroimidazole is treated with p-chlorobenzoyl chloride to give the 1-isopropyl-5-nitro-α-(p-chlorophenyl)-2-imidazoleethenol p-chlorobenzoate.

EXAMPLE 5

Preparation of 1-isobutyl-5-nitro-α-(p-acetoxyphenyl)-2-imidazoleethenol p-acetoxybenzoate Following the general procedure of Example 1, 1-isobutyl-2-methyl-5-nitroimidazole is treated with p-acetoxybenzoyl bromide to give the 1-isobutyl-5-nitro-α-(p-acetoxyphenyl)-2-imidazoleethenol p-acetoxybenzoate.

EXAMPLE 6

Preparation of 1-oximino-1-(1-methyl-5-nitro-2-imidazolyl)-2-phenylglyoxal

A mixture of 60 grams, 0.172 mole, of 1-methyl-5-nitro-α-phenyl-2-imidazoleethenol benzoate, 240 ml. of water, 240 ml. of ethanol, and 200 ml. of 37 percent hydrochloric acid is refluxed for 6 hours. The resulting solution is allowed to cool to room temperature and then cooled in an ice bath to 17°–20°C. A solution of 35 grams, 0.507 mole, of sodium nitrite in 100 ml. of water is added slowly over a period of about 1 hour, maintaining the temperature between about 17°–20°C. The resulting suspension is stirred at about room temperature for 5 hours, the product is filtered, washed with 500 ml. of water, then 75 ml. of acetone, and dried. There is obtained 41.7 grams, 89 percent, of 1-oximino-1-(1-methyl-5-nitro-2-imidazolyl)-2-phenylglyoxal, m.p. 187°–188°C. (dec.).

EXAMPLE 7

Preparation of 1-oximino-1-(1-ethyl-5-nitro-2-imidazolyl)-2-phenylglyoxal

In place of the 1-methyl-5-nitro-α-phenyl-2-imidazoleethenol benzoate of Example 6, there is employed an equimolar quantity of 1-ethyl-5-nitro-α-phenyl-2-imidazoleethenol benzoate whereby the 1-oximino-1-(1-ethyl-5-nitro-2-imidazolyl)-2-phenylglyoxal is obtained in equally good yield.

EXAMPLE 8

Preparation of 1-oximino-1-(1-ethyl-5-nitro-2-imidazolyl)-2-(p-tolyl)glyoxal

The procedure of Example 6 is repeated, substituting an equimolar amount of 1-ethyl-5-nitro-α-(p-tolyl)-2-imidazoleethenol p-toluate for the 1-methyl-5-nitro-α-phenyl-2-imidazoleethenol benzoate employed in that example. There is thus obtained the 1-oximino-1-(1-ethyl-5-nitro-2-imidazolyl)-2-(p-tolyl)glyoxal.

EXAMPLE 9

Preparation of 1-oximino-1-isopropyl-5-nitro-2-imidazolyl)-2-(p-chlorophenyl)glyoxal By replacing the 1-methyl-5-nitro-α-phenyl-2-imidazoleethenol benzoate employed in Example 6 with an equimolar quantity of 1-isopropyl-5-nitro-α-(p-chlorophenyl)-2-imidazoleethenol p-chlorobenzoate and following substantially the same procedure described in Example 6, there is obtained the 1-oximino-1-(1-isopropyl-5nitro-2-imidazolyl)-2-(p-chlorophenyl)-glyoxal.

EXAMPLE 10

Preparation of 1-oximino-1-(1-isobutyl-5-nitro-2-imidazolyl)-2-(p-acetoxyphenyl)glyoxal Following the general procedure of Example 6, 1isobutyl-5-nitro-α-(p-acetoxyphenyl)-2-imidazoleethenol p-acetoxy-benzoate is hydrolyzed and nitrosated to give the 1-oximino-1-(1-isobutyl-5-nitro-2-imidazolyl)-2-(p-acetoxyphenyl)glyoxal.

EXAMPLE 11

Preparation of the mixed anhydride of N-benzoyl-1-methyl-5-nitro-2-imidazolecarboximidic acid and benzoic acid A mixture of 2.74 grams, 0.01 mole, of 1-oximino-1-(1-methyl-5-nitro-2-imidazolyl)-2-phenylglyoxal and 10 ml., 0.087 mole, of benzoyl chloride, is heated at about 95°C. for about 2 hours. The mixture is cooled, filtered, washed with 30 ml. of toluene in portions and dried. There is obtained 3.60 grams, 95 percent, of the mixed anhydride of N-benzoyl-1-methyl-5-nitro-2-imidazolecarboximidic acid and benzoic acid, m.p. 222°–224°C.

EXAMPLE 12

Preparation of the mixed anhydride of N-benzoyl-1-methyl-5-nitro-2-imidazolecarboximidic acid and benzoic acid A mixture of 5.00 grams, 0.0182 mole, of 1-oximino-1-(1-methyl-5-nitro-2-imidazolyl)-2-phenylglyoxal, 3.2 ml., 0.0274 mole, of benzoyl chloride, and 30 ml. of acetonitrile is refluxed for 2 hours. The reaction mixture is cooled, filtered, washed twice with methanol and dried. There is obtained 6.57 grams, 95 percent, of the mixed anhydride, m.p. 222°–224°C.

EXAMPLE 13

Preparation of the mixed anhydride of N-benzoyl-1-methyl-5-nitro-2-imidazolecarboximidic acid and 4-nitrobenzoic acid This compound is prepared by the method described in Example 12. From 5.00 grams of 1-oximino-1-(1-methyl-5-nitro-2-imidazolyl)-2-phenylglyoxal and 5.08 grams of 4-nitrobenzoyl chloride is obtained the mixed anhydride of N-benzoyl-1-methyl-5-nitro-2-imidazolecarboximidic acid and 4-nitrobenzoic acid, m.p. 214°–215°C.

EXAMPLE 14

Preparation of the mixed anhydride of N-benzoyl-1-methyl-5-nitro-2-imidazolecarboximidic acid and 4-methoxybenzoic acid This compound is prepared by the method described in Example 12. From 5.00 grams of 1-oximino-1-(1-methyl-5-nitro-2-imidazolyl)-2-phenylglyoxal and 4.67 grams of anisoyl chloride is obtained the mixed anhydride of N-benzoyl-1-methyl-5-nitro-2-imidazolecarboximidic acid and 4-methoxybenzoic acid, m.p. 201°–203°C.

EXAMPLE 15

Preparation of the mixed anhydride of N-benzoyl-1-ethyl-5-nitro-2-imadazolecarboximidic acid and benzoic acid The procedure of Example 11 is repeated, substituting an equimolar amount of 1-oximino-1-(1-ethyl-5-nitro-2-imidazolyl)-2-phenylglyoxal employed in that example. There is thus obtained the mixed anhydride of N-benzoyl-1-ethyl-5-nitro-2-imidazolecarboximidic acid and benzoic acid.

EXAMPLE 16

Preparation of the mixed anhydride of N-(p-toluyl)-1-ethyl-5-nitro-2-imidazolecarboximidic acid and p-bromobenzoic acid Following the general procedure of Example 12, 1-oximino-1-(1-ethyl-5-nitro-2-imidazolyl)-2-(p-tolyl)glyoxal is treated with p-bromobenzoyl bromide to give the mixed anhydride of N-(p-toluyl)-1-ethyl-5-nitro-2-imidazolecarboximidic acid and p-bromobenzoic acid.

EXAMPLE 17

Preparation of the mixed anhydride of N-(p-chlorobenzoyl)-1-isopropyl-5-nitro-2-imidazolecarboximidic acid and p-acetylbenzoic acid Following the general procedure of Example 12, 1-oximino-1-(1-isopropyl-5-nitro-2-imidazolyl)-2-(p-chlorophenyl)glyoxal is treated with p-acetylbenzoyl bromide to give the mixed anhydride of N-(p-chlorobenzoyl)-1-isopropyl-5-nitro-2-imidazole-carboximidic acid and p-acetylbenzoic acid.

EXAMPLE 18

Preparation of the mixed anhydride of N-(p-acetoxybenzoyl)-1-isobutyl-5-nitro-2-imidazolecarboximidic acid and p-acetamidobenzoic acid Following the general procedure of Example 12, 1-oximino-1-(1-isobutyl-5-nitro-2-imidazolyl)-2-(p-acetoxyphenyl)glyoxal is treated with p-acetamidobenzoyl chloride to give the mixed anhydride of N-(p-acetoxybenzoyl)-1-isobutyl-5-nitro-2-imidazolecarboximidic acid and p-acetamidobenzoic acid.

EXAMPLE 19

Preparation of 1-(1-methyl-5-nitro-2-imidazolecarboximidoyl)-3-thiosemicarbazide A mixture of 3.78 grams, 0.010 mole, of the mixed anhydride of N-benzoyl-1-methyl-5-nitro-2-imidazolecarboximidic acid and benzoic acid, 20 ml. of methanol and 0.81 gram, 0.015 mole, of sodium methoxide is stirred at room temperature for 2.5 hours. Thiosemicarbazide, 0.91 gram, 0.010 mole, and 1 ml. of glacial acetic acid are added and the mixture is stirred at room temperature for an additional 4 hours. The reaction mixture is then cooled in ice and filtered. The red-orange residue is slurried with a 20 percent solution of sodium bicarbonate and stirred for 1 hour, filtered, washed with water and methanol, and dried. There is obtained 1.70 grams of product, m.p. 186°–201°C. Recrystallization from a mixture of ethanol and dimethyl-formamide gives a product with a m.p. of 208°–210°C. (dec.).

EXAMPLE 20

Preparation of 1-(1-methyl-5-nitro-2-imidazolecarboximidoyl)-4-isopropyl-3-thiosemicarbazide Following the general procedure of Example 19, the mixed anhydride of N-benzoyl-1-methyl-5-nitro-2-imidazolecarboximidic acid and 4-nitrobenzoic acid is treated with 4-isopropyl-3-thiosemicarbazide to give the 1-(1-methyl-5-nitro-2-imidazole-carboximidoyl)-4-isopropyl-3-thiosemicarbazide.

EXAMPLE 21

Preparation of 1-(1-methyl-5-nitro-2-imidazolecarboximidoyl)-4,4-diethyl-3-thiosemicarbazide Following the general procedure of Example 19, the mixed anhydride of N-benzoyl-1-methyl-5-nitro-2-imidazolecarboximidic acid and 4-methoxybenzoic acid is treated with 4,4-diethyl-3-thiosemicarbazide to give the 1-(1-methyl-5-nitro-2-imidazole-carboximidoyl)-4,4-diethyl-3-thiosemicarbazide.

EXAMPLE 22

Preparation of 1-(1-ethyl-5-nitro-2-imidazolecarboximidoyl)-3-thiosemicarbazide

Following the general procedure of Example 19, the mixed anhydride of N-benzoyl-1-ethyl-5-nitro-2-imidazolecarboximidic acid and benzoic acid is treated with thiosemicarbazide to give the 1-(1-ethyl-5-nitro-2-imidazolecarboximidoyl)-3-thiosemicarbazide.

EXAMPLE 23

Preparation of 1-(1-ethyl-5-nitro-2-imidazolecarboximidoyl)-4,4-dimethyl-3-thiosemicarbazide Following the general procedure of Example 19, the mixed anhydride of N-(p-toluyl)-1-ethyl-5-nitro-2-imidazolecarboximidic acid and p-bromobenzoic acid is treated with 4,4-dimethyl-3-thiosemicarbazide to give the 1-(1-ethyl-5-nitro-2-imidazolecarboximidoyl)-4,4-dimethyl-3-thiosemicarbazide.

EXAMPLE 24

Preparation of 1-(1-methyl-5-nitro-2-imidazolecarboximidoyl)-3-thiosemicarbazide A mixture of 80 ml. of n-butanol, 1.40 grams, 0.026 mole, of sodium methoxide and 7.56 grams, 0.020 mole, of the mixed anhydride of N-benzoyl-1-methyl-5-nitro-2-imidazolecarboximidic acid and benzoic acid is stirred at room temperature for 3 hours. Thiosemicarbazide, 1.82 grams, 0.020 mole, and 3 ml. of glacial acetic acid are added and the mixture is stirred at room temperature for an additional 4 hours. The reaction mixture is cooled in ice, filtered, washed successively with four 1-ml. portions of methanol, 150 ml. of water, and 4 1-ml. portions of methanol, and dried. The red-orange residue is slurried with a 20 percent sodium bicarbonate solution, stirred for 1 hour, filtered, washed thoroughly with water and dried. There is obtained 2.5 grams of product, m.p. 189°–202°C. (dec.), which was recrystallized from a mixture of ethanol and dimethyl formamide to give a m.p. of 209°–212°C. (dec.).

EXAMPLE 25

Preparation of 1-(1-isopropyl-5-nitro-2-imidazolecarboximidoyl)-4-methyl-3-thiosemicarbazide Following the general procedure of Example 24, the mixed anhydride of N-(p-chlorobenzoyl)-1-isopropyl-5-nitro-2-imidazolecarboximidic acid and p-acetylbenzoic acid is treated with 4-methyl-3-thiosemicarbazide to give the 1-(1-isopropyl-5-nitro-2-imidazolecarboximidoyl)-4-methyl-3-thiosemicarbazide.

EXAMPLE 26

Preparation of 1-(1-isobutyl-5-nitro-2-imidazolecarboximidoyl)-4-ethyl-3-thiosemicarbazide Following the general procedure of Example 24, the mixed anhydride of N-(p-acetoxybenzoyl)-1-isobutyl-5-nitro-2-imidazolecarboximidic acid and p-acetamidobenzoic acid is treated with 4-ethyl-3-thiosemicarbazide to give the 1-(1-isobutyl-5nitro-2-imidazolecarboximidoyl)-4-ethyl-3-thiosemicarbazide.

EXAMPLE 27

Preparation of 2-amino-5-(1-methyl-5-nitro-2-imidazolyl)-1,3,4-thiadiazole

A mixture of 3.80 grams, 0.0156 mole, of 1-(1-methyl-5-nitro-2-imidazolecarboximidoyl)-3-thiosemicarbazide, 30 ml. of methanol, and 12 ml. of 37 percent hydrochloric acid is refluxed for 1 hour, cooled in ice and filtered. The crystalline residue is suspended in 200 ml. of water, stirred for 2 hours, filtered, washed thoroughly with water, then with four 1-ml. portions of methanol, and dried. There is obtained 2.93 grams of product, m.p. 262°–264°C. (dec.).

EXAMPLE 28

The general procedure of Example 27 is repeated using a series of different starting materials. These starting materials and the corresponding products are set forth in the following table.

lowed to stir at room temperature for an additional 5 hours. Hydrochloric acid, 37 percent, 10 ml., is added and the mixture is refluxed for 1 hour, cooled and filtered. The crystalline residue is suspended in 200 ml. of a 20 percent solution of sodium bicarbonate, stirred for 2 hours, filtered, washed thoroughly with water, then with four 1-ml. portions of methanol and dried. There is obtained 1.80 grams, of product which, after recrystallization from dimethylformamide, melts at 264°–266°C. (dec.).

I claim:

1. A process for preparing a 1-(lower alkyl)-5-nitro-2-imidazolecarboximidate ester of the formula:

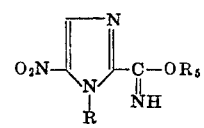

wherein R is lower alkyl, and $R_5$ is lower alkyl; which comprises contacting a compound of the formula:

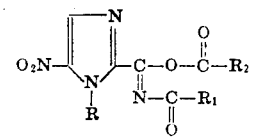

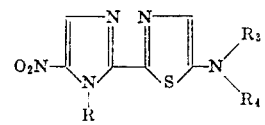

(IV)

| Starting material | Product | R | $R_3$ | $R_4$ |
|---|---|---|---|---|
| 1-(1-methyl-5-nitro-2-imidazolecarboximidoyl)-4-isopropyl-3-thiosemicarbazide | IVa | $CH_3$ | H | $CH(CH_3)_2$ |
| 1-(1-methyl-5-nitro-2-imidazolecarboximidoyl)-4,4-diethyl-3-thiosemicarbazide | IVb | $CH_3$ | $C_2H_5$ | $C_2H_5$ |
| 1-(1-ethyl-5-nitro-2-imidazolecarboximidoyl)-3-thiosemicarbazide | IVc | $C_2H_5$ | H | H |
| 1-(1-ethyl-5-nitro-2-imidazolecarboximidoyl)-4,4-dimethyl-3-thiosemicarbazide | IVd | $C_2H_5$ | $CH_3$ | $CH_3$ |
| 1-(1-isopropyl-5-nitro-2-imidazolecarboximidoyl)-4-methyl-3-thiosemicarbazide | IVe | $CH(CH_3)_2$ | H | $CH_3$ |
| 1-(1-isobutyl-5-nitro-2-imidazolecarboximidoyl)-4-ethyl-3-thiosemicarbazide | IVf | $CH_2CH(CH_3)_2$ | H | $C_2H_5$ |

EXAMPLE 29

Preparation of 2-amino-5-(1-methyl-5-nitro-2-imidazolyl)-1,3,4-thiadiazole

A mixture of 40 ml. of methanol, 1.40 grams, 0.026 mole, of sodium methoxide and 7.56 grams, 0.020 mole, of the mixed anhydride of N-benzoyl-1-methyl-5-nitro-2-imadazolecarboximidic acid and benzoic acid is stirred at room temperature for 3 hours. Thiosemicarbazide, 1.82 grams, 0.020 mole, and 3 ml. of glacial acetic acid are added and the reaction mixture is alwherein R is lower alkyl, $R_1$ is selected from the group consisting of phenyl and para-substituted phenyl, and $R_2$ is selected from the group consisting of phenyl and para-substituted phenyl with a strong base in a solvent of the formula: $R_5$ OH wherein $R_5$ is lower alkyl, at from 0°C. to about 100°C. for a period of time of from about one to about 5 hours.

2. The process in accordance with claim 1 wherein R is methyl, $R_1$ is phenyl, $R_2$ is phenyl and the strong base is sodium methoxide.

* * * * *